(No Model.)

D. McDONALD.
GRATING.

No. 402,847. Patented May 7, 1889.

WITNESSES:
Fred G. Dieterich
Edw. H. Byrn.

INVENTOR:
Donald McDonald
BY
Munn & Co.
ATTORNEYS.

UNITED STATES PATENT OFFICE.

DONALD McDONALD, OF LOUISVILLE, KENTUCKY.

GRATING.

SPECIFICATION forming part of Letters Patent No. 402,847, dated May 7, 1889.

Application filed December 13, 1888. Serial No. 293,528. (No model.)

*To all whom it may concern:*

Be it known that I, DONALD MCDONALD, of Louisville, in the county of Jefferson and State of Kentucky, have invented a new and useful Improvement in Gratings, of which the following is a specification.

The object of my invention is to provide a grating for use of jails, fences, and other work, which shall be made entirely of round metal bars and couplings; and it consists in the peculiar construction and arrangement of parts which I will now proceed to describe.

Figure 1:
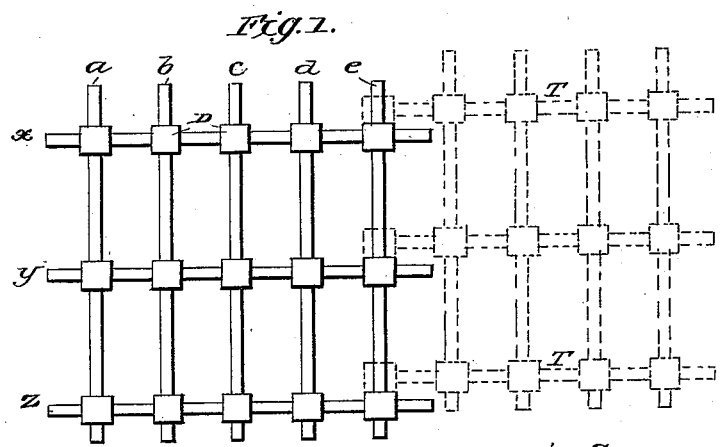
Figure 2:
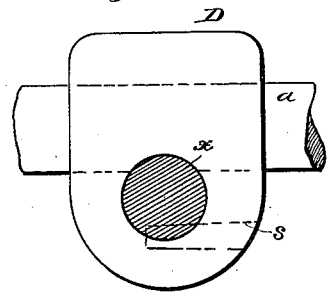
Figure 3:
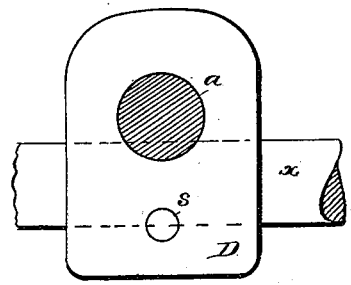

Figure 1 is a side elevation of the grating. Figs. 2 and 3 are views taken at right angles to each other of the metal couplings for connecting the bars at their points of intersection.

Referring to Fig. 1, the grating is constructed of the upright parallel round bars $a$ $b$ $c$ $d$ $e$ and the horizontal parallel bars $x$ $y$ $z$, crossed at right angles upon bars $a$ $b$ $c$ $d$ $e$ and joined at their points of intersection by couplings D. These couplings are solid blocks which have holes through them at right angles and of the size of the intersecting rods, which holes intersect, so that when the bars are in place one bar, $x$, projects into the space for bar $a$, so that the latter must have a notch or gain cut in the same corresponding to the periphery of bar $x$, by which means the bar $a$ is locked in the coupling D by the bar $x$.

To lock bar $x$ in turn, it has a notch cut transversely in the same, which, when coinciding with a hole in the coupling, receives a key, S, which is driven in at right angles to bar $x$, which completes the locking of the two bars in the coupling D.

The key S may be omitted altogether by putting the bars in as follows: The bars, $a$, $c$, and $e$ are first set up and the couplings slipped on them. Then the bars $x$ and $z$ are driven through, the bars $a$, $c$, and $e$ having been previously gained or notched to allow the bars $x$ and $z$ to pass. Bars $b$ and $d$ are then driven in, the bars $x$ and $z$ having been gained or notched to allow it, and, finallly, bar $y$ is driven in through the gains or notches in bars $b$ and $d$, thus locking the entire structure.

The doors for jails are made of the same kind of grating, the hinges being formed, as shown in dotted lines, Fig. 1, by couplings on the end of bars T, which couplings turn about the bar $e$ as a pintle or hinge point.

Having thus described my invention, what I claim as new is—

1. A grating composed of round bars of metal gained and intersecting each other, and couplings D covering the joint, substantially as shown and described.

2. A grating composed of round bars of metal, one of which is cut or gained and intersected by the other, a coupling, D, covering the joint, and a key, S, locking the uncut bar, substantially as shown and described.

3. A grating composed of the vertical bars $a$ $c$ $e$, horizontal bars $x$ and $z$, the vertical bars $b$ and $d$ alternating with $a$ $c$ $e$, and the horizontal bar $y$ alternating with $x$ and $z$, and couplings D, the said bars being gained and put together in the order of their mention, substantially as described.

DONALD McDONALD.

Witnesses:
   GEO. H. ALEXANDER,
   J. N. KEHOE.